Oct. 13, 1936.  L. J. DAWSON  2,057,231
FAUCET
Filed Sept. 7, 1935
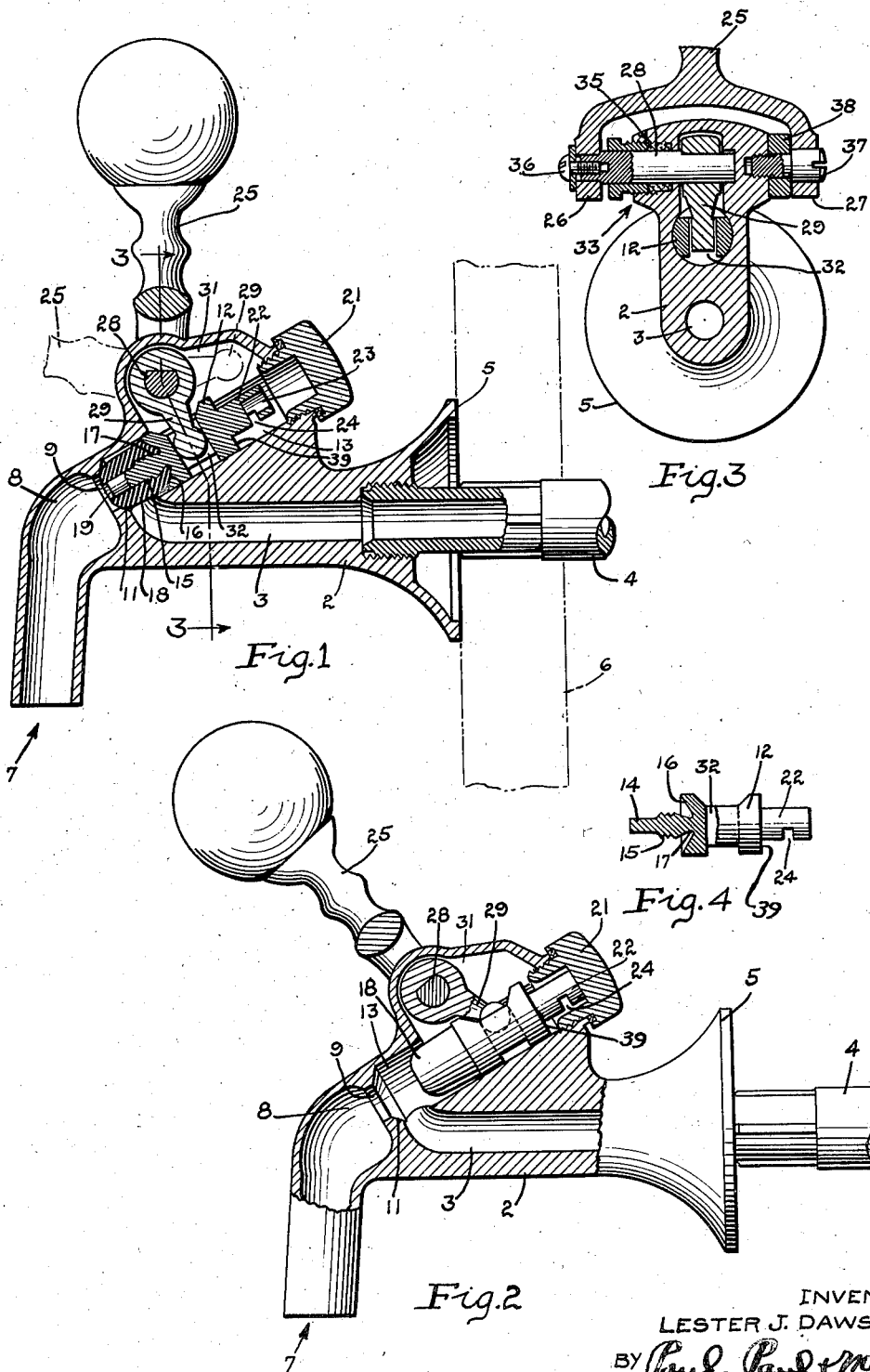
INVENTOR
LESTER J. DAWSON
BY Paul, Paul & Moore
ATTORNEYS Patented Oct. 13, 1936

2,057,231

UNITED STATES PATENT OFFICE 2,057,231

FAUCET

Lester J. Dawson, Minneapolis, Minn.

Application September 7, 1935, Serial No. 39,591

4 Claims. (Cl. 251—41)

This invention relates to new and useful improvements in faucets, and more particularly to faucets especially designed for dispensing gaseous liquids such as beer.

An object of the present invention is to provide a beer faucet of simple and inexpensive construction comprising a valve mounted for reciprocal movement which, when opened, is entirely out of the beer stream, so that the beer may flow unobstructedly through the valve substantially without agitation.

A further object is to provide a beer faucet provided with a suitable dispensing nozzle and having a passage therein adapted to be connected to a beer supply under pressure, and a valve being interposed between the beer nozzle and said passage for controlling flow through the nozzle, said valve being so constructed and arranged that the pressure of the carbon dioxide and other gas content of the beer will tend to hold the valve on its seat when closed.

Other objects of the invention reside in the simple construction of the valve as a whole, whereby the valve means therein may readily be removed for cleaning or repairs, when necessary, without disassembling the entire valve; in the provision of the expansion chamber provided at the upper end of the dispensing nozzle, into which the beer may expand from the valve opening, to thereby cause the beer to flow from the nozzle without agitation, and whereby excessive foaming is substantially eliminated; in the particular arrangement of the plunger guide, which is disposed at an incline with respect to the beer passage whereby, when the plunger is in open position, the beer may flow freely through the faucet without restriction; and, in the unique construction of the valve means of the faucet, which comprises a plunger mounted for reciprocal movement in a suitable guide and having a stem at one end provided with a series of threads, and the adjacent ends of the valve body being provided with a concave conical seat adapted to be engaged by one end of a suitable sealing element fitting over said stem.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 is a vertical sectional view of my improved faucet showing the plunger in closed position;

Figure 2 is a similar view showing the plunger in open position;

Figure 3 is a cross-sectional view on the line 3—3 of Figure 1; and

Figure 4 is a view showing the plunger removed from the faucet.

The novel faucet herein disclosed, is shown comprising a body 2 having a suitable passage 3 therein, one end of which is adapted to be connected to a suitable conduit or pipe 4, leading to a suitable beer supply, under pressure. The body 2 is provided with a suitable flange 5 adapted to be seated against a suitable support 6, indicated by dotted lines in Figure 1.

A dispensing nozzle, generally indicated by the numeral 7, is provided at the opposite end of the body 2 and has an enlarged chamber 8 at its upper end which communicates with a valve opening 9, surrounded by an annular seat 11. The valve opening 9 communicates with the passage 3, as best shown in Figure 2.

An important feature of the invention resides in the construction of the valve means for controlling liquid flow from the passage 3 and through the nozzle 7. This valve means is clearly illustrated in Figures 1 and 2, and comprises a plunger, generally indicated by the numeral 12, which is slidably mounted in a suitable guide 13, shown disposed at an incline with respect to the passage 3, and having one end communicating therewith.

The plunger body 12 is provided at one end with a stem 14 having a series of threads 15. The adjacent end of the plunger 12 is formed with a concave, conical seat 16, from the bottom of which the stem 14 projects. The stem 14 is undercut, as shown at 17, at the point where it is connected to the plunger 12.

An important feature of the invention resides in the specific construction of the plunger 12, which, as shown in Figures 1 and 2, comprises a suitable sealing element 18, preferably of rubber, and having a cylindrical bore 19 adapted to receive the stem 14. The inner end of the element 18 is shaped to correspond substantially to the shape of the conical seat provided in the valve body 12, whereby when the element is screwed onto the threads of the stem 14, the inner end thereof will be forced against the conical seat 16 and into the undercut portion or recess of the stem. When the element 18 is thus screwed to the stem 14, its inner-end will contract, whereby it is forced into the annular recess 17, thereby to secure the element to the stem 14 in such manner that it cannot accidentally become detached therefrom. As a result of thus securing the sealing element to the stem, no additional means are required for securing it to the stem 14 as, for example, a nut received in threaded engagement with the end of the stem.

Another important feature of the novel faucet herein disclosed, resides in the particular manner in which the plunger 12 is supported in the guide 13, whereby a portion of the gas content of the beer may enter the guide 13 and thereby exert a downward pressure upon the plunger to assist in retaining it on the seat 11, when closed. This is accomplished by so fitting the body of the plunger 12 in the guide 13, that when the lower end of the sealing element 18 approaches the valve seat 11, during the operation of closing the faucet, the pressure in the beer line will cause a portion of the gas content thereof to enter the guide 13, back of the plunger 12, which gas or liquid will exert a downward pressure on the plunger, and thereby force the sealing element 18 into engagement with the seat 11, without the use of a spring.

The upper end of the guide chamber 13 is shown closed by a suitable cap or plug 21, received in threaded engagement with the walls of the guide, as best shown in Figures 1 and 2. The upper end of the plunger 12 has a reduced portion 22 provided with a terminal bore 23, the lower end of which has a slot 24, whereby a suitable instrument, not shown, may be inserted through the open end of the guide 13, when the plug 21 is removed, and into engagement with the slot 24, whereby the plunger may readily be withdrawn from the guide 13.

The means for operating the plunger is shown comprising an operating handle 25, the lower end of which is forked, as shown in Figure 3, to provide spaced legs 26 and 27. A rock shaft 28 has one end of a suitable arm 29 non-rotatably secured thereto within a chamber 31, provided in the upper portion of the body 2 of the faucet. The lower end of the arm 29 is received in a socket 32 in the plunger, whereby when the arm 29 is oscillated, reciprocal movement is imparted to the plunger, as will readily be understood.

A rock shaft 28 is supported in a suitable bearing provided in the body 2 of the faucet, and generally indicated by the numeral 33. A suitable packing, generally indicated by the numeral 35, prevents leakage around the rock shaft 28. The outer end of the rock shaft is suitably secured to the leg 26 of the operating handle 25 by a suitable screw 36, and the opposite leg 27 of the handle is pivotally supported upon a stud 37 secured to the body 2 of the faucet, as clearly illustrated in Figure 3. A suitable spacing collar 38 is shown interposed between the leg 27 of the operating handle, and the body 2, to facilitate the removal of the operating handle from the valve body without removing the rock shaft 28. In other words, when the screw 36 is removed from the end of the rock shaft 28, and the stud 37 and spacing collar 38 are removed, the operating handle may be moved in a direction towards the left, when viewed as shown in Figure 3, whereby the leg 26 of the handle will disengage the terminal of the rock shaft 28.

The novel beer faucet, herein disclosed, has been found very practical and efficient for dispensing beer and other gaseous liquids. Because of the unique construction of the valve means, the stored beer pressure will act upon the end surface 39 of the plunger 12, and thereby force the sealing element 18 to its seat, whereby no springs are necessary to retain the sealing element 18 on its seat. Also, because of the pressure of the liquid tending to retain the element 18 on its seat, the packing shown at 35 in Figure 3 need not be as tight, as is customary in devices of this general character. It will also be noted that the valve is not in any way, dependent upon any mechanical forces to retain it upon its seat, whereby the construction of the faucet is simplified.

The expansion chamber 8 at the upper end of the dispensing nozzle 7 is also important, as it permits the beer to expand thereinto when the valve is initially opened, whereby a portion of the gas in the beer is spent before the beer flows from the discharge end of the nozzle, whereby agitation of the beer is minimized, and, as a result, the beer may be drawn from the faucet without foaming excessively. It is also to be noted that when the plunger is in open position, as shown in Figure 2, the sealing element 18 is entirely out of the beer stream, whereby the beer may flow from the passage 3 in the faucet through the valve opening 9, and into the dispensing nozzle without restriction and without becoming unnecessarily agitated. The faucet also presents the utmost in simplicity, as it comprises very few moving parts, all of which may readily be removed from the body 2 of the faucet without removing the faucet from its supporting means.

I claim as my invention:

1. A beer faucet comprising a body provided with a dispensing nozzle and having a passage therein, one end of which is adapted for connection to a source of beer under pressure, valve means interposed between the nozzle and said passage comprising a valve seat and a plunger, said body having a guide for the plunger located out of the path of liquid flow through the faucet, means for moving the plunger into or out of engagement with the seat to control the flow of beer from the passage to the nozzle, and means whereby a portion of the beer may enter said guide behind the plunger, thereby to urge it into engagement with its seat, said plunger, when in open position, being disposed entirely out of the normal path of the beer stream, whereby an unobstructed passage is provided therefor.

2. A beer faucet comprising a body having a dispensing nozzle at one end and a passage adapted for connection to a beer supply under pressure, valve means interposed between the nozzle and said passage, said valve means comprising a valve seat and a plunger mounted for sliding movement in a suitable guide chamber, a conical seat at one end of the plunger, a stem projecting from said seat, a sealing element on said stem adapted to engage the valve seat to control liquid flow through the valve, and means made integral with the stem and cooperating with said conical seat to secure the sealing element to the plunger.

3. A beer faucet comprising a body having a dispensing nozzle at one end and a passage adapted for connection to a beer supply under pressure, valve means interposed between the nozzle and said passage, said valve means comprising a valve seat and a plunger mounted for sliding movement in a suitable guide and having a concave seat at one end, a stem projecting from said concave seat and having a series of threads intermediate its ends, a suitable sealing element secured to said stem and adapted to engage a seat to control flow through the valve, and means whereby the sealing element is contracted, when engaged with the concave seat, thereby to inseparably secure it to the stem.

4. A beer faucet comprising a body having a dispensing nozzle at one end and a passage adapted for connection to a beer supply under pressure, valve means interposed between the nozzle and the passage, said valve means comprising a valve seat and a plunger mounted for sliding movement in a suitable guide, and the plunger having a concave, conical seat at one end, a stem projecting from said concave seat and having a series of threads thereon intermediate its ends, said stem being annularly undercut between said threads and said concave seat, and a compressible sealing element fitted onto said stem and secured thereto by said threads, said concave seat operating to contract the sealing element, when the latter is forced thereagainst by said threads, whereby a portion of the sealing element is compressed into the undercut portion of the stem, thereby to secure it thereto.

LESTER J. DAWSON.